Aug. 11, 1964        H. A. POWERS ETAL        3,144,112
              FARE COLLECTING APPARATUS
Filed Sept. 12, 1960                    7 Sheets-Sheet 1

INVENTORS
HOWARD A. POWERS
EVERETT V. THOMAS
BY
*Salter + Michaelson*
ATTORNEYS

FIG. 3

INVENTORS
HOWARD A. POWERS
EVERETT V. THOMAS

INVENTORS
HOWARD A. POWERS
EVERETT V. THOMAS
BY
Salter & Michaelson
ATTORNEYS

United States Patent Office 3,144,112
Patented Aug. 11, 1964

3,144,112
FARE COLLECTING APPARATUS
Howard A. Powers, Medfield, and Everett V. Thomas, Fall River, Mass., assignors to Universal Controls, Inc., New York, N.Y., a corporation of Maryland
Filed Sept. 12, 1960, Ser. No. 55,256
19 Claims. (Cl. 194—9)

The present invention relates to fare collecting apparatus. More particularly, the present invention relates to fare collecting apparatus for use in controlling access through a barrier such as a turnstile. In connection with the present invention, reference is made to the patent to Miller No. 2,848,158 which relates generally to the subject matter embodied herein.

At turnstile controlled stations it has been the usual practice to incorporate a fare collecting machine in combination with the turnstile unit. Heretofore, the fare collecting machine included a small slot into which a coin or token was deposited, the depositing of the coin or token releasing a ratchet mechanism that provided for rotation of the turnstile unit, thereby permitting entry of a patron through the barrier. In such turnstile constructions, the fare collecting machine was adapted to receive only a single token or fare at one time, and, as a result, much inconvenience and slowdown in passenger egress resulted when the passenger sought the proper change or a token at a cashier's booth. In certain subway systems, tokens are required and thus, even if the passenger does have the correct change, it is still necessary to purchase a token in order to gain access through the turnstile. Surveys in the field have shown that many delays are encountered as a result of passengers seeking change or tokens at the cashier's booth, and that as a result the cashier not only has a full-time job in supplying change and tokens to the passengers, but is prevented from adequately supervising entry of passengers through the turnstiles. The present invention is designed to eliminate the attendant difficulties heretofore associated with prior known turnstile machines and provides a fare collecting device that permits the depositing of a plurality of coins or fare parts, the aggregate of which constitutes a fare paid. The fare collecting machine embodied herein further includes means for gauging the diameters of the coins deposited therein, so that if a slug having a diameter that is different from the diameter of a valid coin is deposited in the machine, the diameter gauging device will detect the presence of the slug and prevent the turnstile from operating. A slug rejecting mechanism is further provided in the present invention that rejects slugs that are detected and if required returns them to the patron through a slug return chute.

The broad concept of the invention further contemplates determining the presence of slugs in the machine by detecting that the characteristics of the slug are different from that of an acceptable coin. Oftentimes slugs are deposited in a coin machine that have the proper diameter of a valid coin but are formed of a magnetically attractable material. In order to detect slugs of this variety, the present invention provides a slug detecting device that includes a magnet that is adapted to be magnetically attracted to the coins formed of ferrous metals, thereby actuating a magnet switch. Closing of the magnet switch operates a slug reject mechanism to reject the ferrous slug from the apparatus.

The gauging mechanism in the present invention is also coordinated with a novel selector contact plate assembly that is responsive to a gauging arm so that when an acceptable coin is gauged, a circuit is completed through the selector contact plate assembly to produce a pulse that is stored in a memory device. When the proper number of pulses have been received, a turnstile solenoid is energized to permit access through the turnstile. If on the other hand an unacceptable coin is received in the machine, the selector contact plate assembly and circuit associated therewith is arranged such that in absence of the pulse a reject solenoid is energized to open a reject door for rejecting the improper fare part or coin therein.

Accordingly, it is an object of the present invention to provide a machine for collecting multiple coin fares for use in controlling access through a barrier, such as a turnstile.

Another object of the invention is to provide a fare collecting device for use in turnstile equipment that will permit rapid transfer of passengers through the turnstile.

Still another object is to provide a fare collecting device wherein multiple fares may be deposited therein, the device being adapted to receive coins of standard denomination, thereby facilitating access through the barrier that the coin machine controls.

Still another object of the present invention is to provide a fare collecting machine in which multiple fare parts may be deposited, unacceptable fare parts being detected and removed from the machine without the registration thereof.

Still another object is to provide gauging means for use in a fare collecting device wherein the diameters of the fare parts introduced into the machine are measured in accordance with the diameters of known coins.

Still another object is to provide diameter gauging means for use in a coin machine that cooperates with a selector plate assembly to produce a pulse or series of pulses for indicating a preselected amount of fare, thereby actuating a barrier control means to provide access through the barrier.

Still another object is to determine the presence of unacceptable coins in the machine by detecting that the characteristics of the unacceptable coin are different from that of acceptable coins.

Still another object is to provide a slug rejecting mechanism that includes a pivotally mounted magnet that is responsive to the presence of unacceptable coins or slugs formed of ferrous metals whereby a slug reject door is actuated to withdraw the slugs for return to the passenger or to a separate receptacle located within the housing.

Other objects, features and advantages of the invention will become apparent as the description thereof proceeds when considered in connection with the accompanying illustrative drawings.

In the drawings which illustrate the best mode presently contemplated by me for carrying out my invention.

Figure 1:
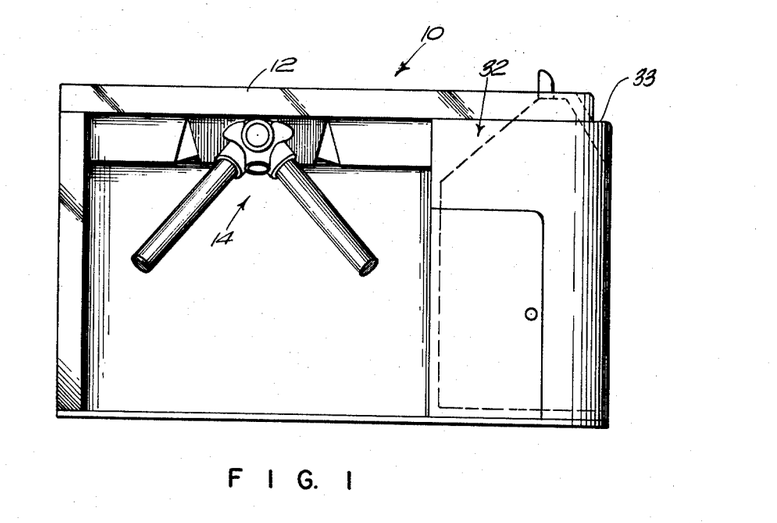
FIG. 1 is a side elevational view of a barrier, such as a turnstile, that is adapted to be controlled by the fare collecting apparatus embodied in the present invention, the fare collecting machine being illustrated as it is installed in the turnstile and being shown in dotted lines.
Figures 2, 2A:
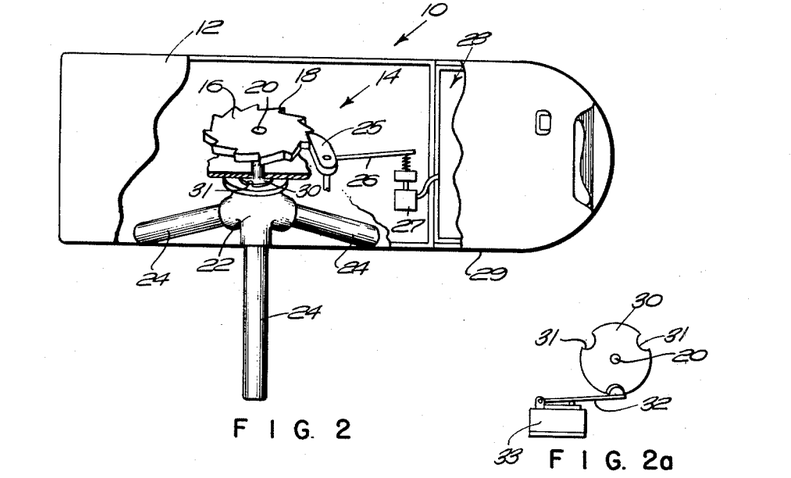
FIG. 2 is a top plan view of the apparatus illustrated in FIG. 1 with a portion of the cover removed thereby showing the ratchet device that is operatively connected to the turnstile unit.
FIG. 2a is an enlarged view of the turnstile switch and actuating means therefor that are operated in response to movement of the patron, through the turnstile unit.

Referring now to the drawings and particularly FIGS. 1 and 2, a barrier construction generally indicated at 10 is illustrated and as shown comprises a housing 12 in which a turnstile unit generally indicated at 14 is mounted. The turnstile unit 14 includes a ratchet wheel 16 on which are formed a plurality of ratchets 18. The ratchet wheel 16 is mounted on a shaft 20 which extends outwardly of the housing 12 and has a fitting 22 mounted thereon in which suitable openings are formed for receiving turnstile bars 24.

In order to control the rotation of the ratchet wheel 18, a pawl 25 is pivotally mounted within the housing 12 and is controlled for pivotal movement by a bar 26 that is pivotally connected thereto, the bar 26 in turn being pivotally connected and movable in response to the operation of a solenoid indicated at 27. The solenoid 27 is electrically connected to a coin or fare collecting machine generally indicated at 28 that is mounted in a forward portion 29 of the housing 12. A cam 30 is mounted on the shaft 20 concentric with the ratchet wheel 16 and is formed with three equally spaced grooves 31 that cooperate with a switch arm 32 to intermittently operate a switch 33. The operation of the switch 33 will be described in more detail hereinafter.

Referring now to FIGS. 3 through 11, the coin machine is illustrated in detail as it is located within the forward portion 29 of the housing 12 and as shown is mounted in an outer housing 34. Positioned within the outer housing 34 is a main supporting frame 35 on which the component parts of the machine are mounted. The main supporting frame 35 which may be cast as an integral unit includes a front wall 36 that extends upwardly and has an enlarged inclined portion 37 integrally joined thereto in which a scavenger coin chute 38 (FIG. 3) is formed, the scavenger chute 38 emptying into a main coin chute 39 as will be described hereinafter. Extending upwardly from the rear of the main supporting frame 35 is a rear central bracket 40 that is reduced in width with respect to the width of the main supporting frame 35 and is inclined at the upper end thereof terminating in a yoke 41, the purpose of which will be described below. An intermediate vertical support 40a (FIG. 5) extends from a cross support 40b to the junction of the yoke 41 and rear bracket 40 and carries the bearings for a countershaft and rotor shaft as will be described hereinafter.

Mounted on the inclined enlarged portion 37 of the main frame is a face plate 42 which defines the front of the coin machine and over which the coins deposited in the machine are adapted to pass. Joined to the upper edge of the face plate 42 by screws 43 and extending upwardly therefrom is a coin inlet 44 that projects through a suitable opening 45 formed in the housing 34 (FIG. 4), the coin inlet 44 being readily accessible to the passengers prior to their entering the turnstile unit 14. Cut out in the coin inlet 44 is a coin slot 46 that communicates with a passage 47 formed therein. The slot 46 and passage 47 are dimensioned to receive nickels, dimes, pennies, quarters and various size tokens but will not accept a fifty-cent piece. However, it is understood that if the coin machine were designed to accept a fifty-cent piece, the slot 46 and passage 47 would be increased in width accordingly.

Overlying a major portion of the face plate 42 and spaced therefrom by rubber cushions (not shown) is a cover plate 48 that is preferably formed of glass so as to afford visibility to the face plate. The cover plate 48 is secured to the face plate by locking fingers 49 that are in turn secured to the face plate 42 by screws 50. The cover plate 48 is formed with a reduced neck portion 52 that abuts the bottom of the coin inlet 44 and cooperates with coin guides to be described to define a coin passage into which the coins are introduced after they have been deposited in the coin inlet. The cover plate 48 is spaced from the face plate 42 only that amount that allows the coins to pass therebetween in flat position, and due to the inclination of the face plate 42, the coins passing through the slot 46 and passage 47 will gravitate at a controlled speed toward the coin guide means.

Communicating with the coin channel defined by the reduced neck portion 52 of the cover plate 48 and the coextensive parallel portion of the face plate 42 is a rotor 58 in which a plurality of peripheral pockets indicated at 60 are formed. Each of the pockets 60 is adapted to receive a coin or fare part during intermittent movement of the rotor, each of the pockets thereby being adapted to successively communicate with the coin inlet channel during the operation of the machine. In order to guide the coins or fare parts as they are directed toward the pockets 60 of the rotor 58, a feed finger generally indicated at 62 is provided together with a guide arm 64 that is spaced from and is located opposite the feed finger 62. The feed finger 62 and the guide arm 64 are disposed immediately adjacent the rotor 58 in spaced relation and thus define a limited access passage through which the coins pass as they gravitate toward the rotor pockets 60. The feed finger 62 is formed with an enlarged lower portion 64 and a reduced upper portion 66 that is pivotally mounted on the face plate 42 by a pivot pin 68, the enlarged lower portion 64 of the feed finger 62 including an inclined cam engaging edge 70. As will be described hereinafter, the feed finger 62 is adapted to be oscillated in accordance with the rotation of the rotor 58, thereby causing the inclined edge 70 to be rocked back and forth, which action tends to agitate the coins as they are directed thereagainst. This agitating action tends to break up any jams of the coins and causes them to move toward the rotor 58 in single file.

The coin guide 64 is also pivotally mounted at 72 and cooperates with the inclined edge 70 of the feed finger 62 to guide the coins toward the pocket 60 of the rotor 58. The guide 64 is normally retained in coin guiding position against a stop 74 by means of spring 76, one arm of which engages a lip of a part 77 under which the coin guide 64 extends. The other arm of the spring engages a rearward extension 78 of the guide 64 and acts to retain the guide 64 in the position as shown. Thus it is seen that as the coins are introduced into the coin slot 46 they will gravitate downwardly through the passage 47 and due to the spacing of the cover plate 48 with respect to the face plate 42 will fall in parallel relation with respect to the face plate. Furthermore, as the coins gravitate toward the rotor 58, the feed finger 62 and the coin guide arm 64 provide for single file entry thereof as they fall into the pockets 60 of the rotor 58.

Figure 3:
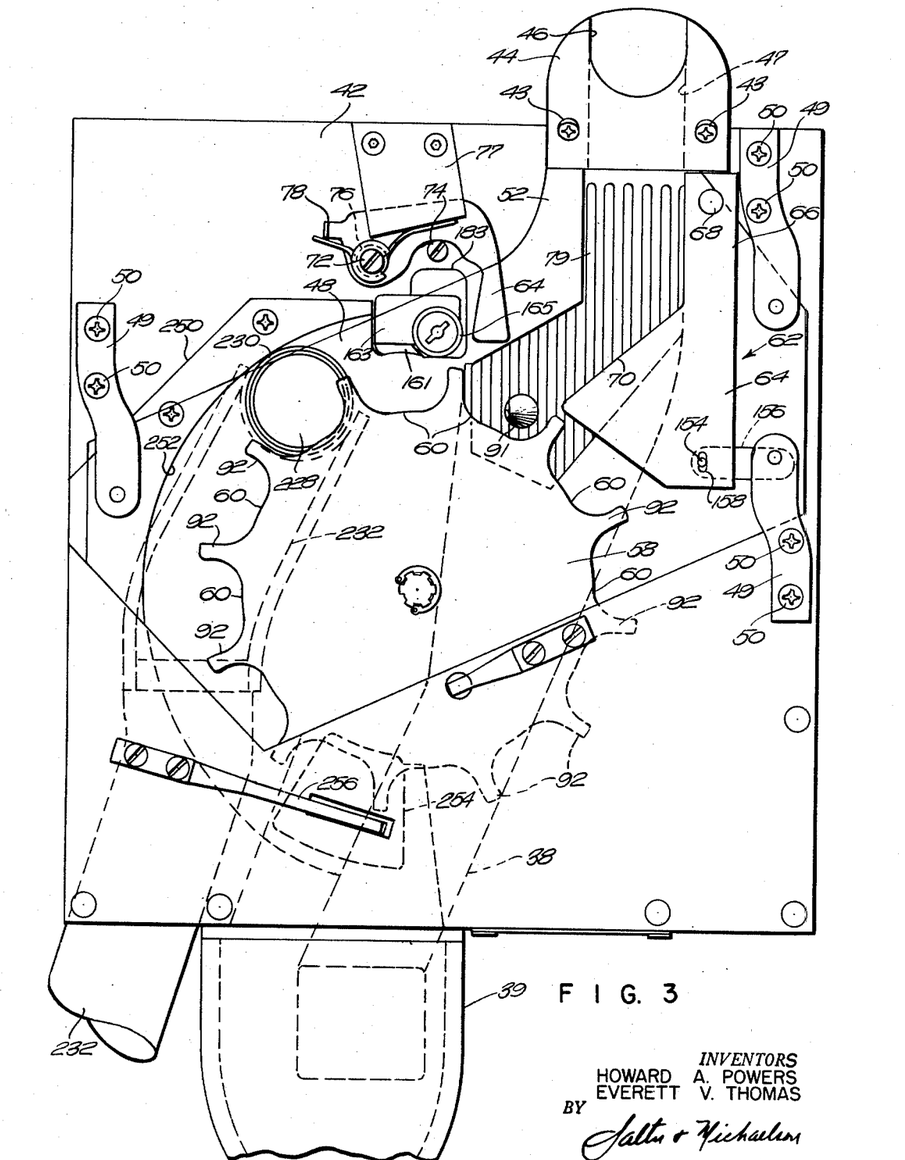
FIG. 3 is a front elevational view of the fare collecting machine illustrated in FIG. 2.

On occasion, it may be desirable to manually eject or scavenge unacceptable coins or foreign objects such as string, sticks, paper clips, keys, etc. that have been inserted into the coin inlet. In such cases the unacceptable coins or slugs or other foreign articles may not reach the rotor pocket 60 due to their excessive thickness or because burrs are formed thereon or because sticky substances are adhered thereto. For the purpose of scavenging articles which stick in the coin passage, a scavenger door 79 is formed in the face plate 42. The scavenger door 79 underlies the reduced neck portion 52 of the cover plate 48 and has a configuration that generally describes the path of the coins as they gravitate toward the rotor 58. As shown more clearly in FIG. 7, the scavenger door 79 is adapted to normally close a scavenging opening 80 that is formed in the face plate 42 and that has a configuration similar to that of the door 79. In order to seal the door 79 in the opening 80 and to provide a stop therefor, a peripheral flange 75 is formed on the door and engages the inner edge of the face plate adjacent the opening 80 when the door 79 is in the closed position thereof. The scavenger chute 38 communicates with the opening 80 and directs the scavenged coins downwardly into the main coin chute 39 as indicated in FIG. 3. In order to reduce the surface area over which the coins slide as they move toward the rotor 58, the front face of the scavenger door 79 is formed with vertically extending striations. Thus, when the door or coins are wet, surface tension between the door surface and the coins is reduced as the coins gravitate downwardly toward the rotor 58.

Figure 7:
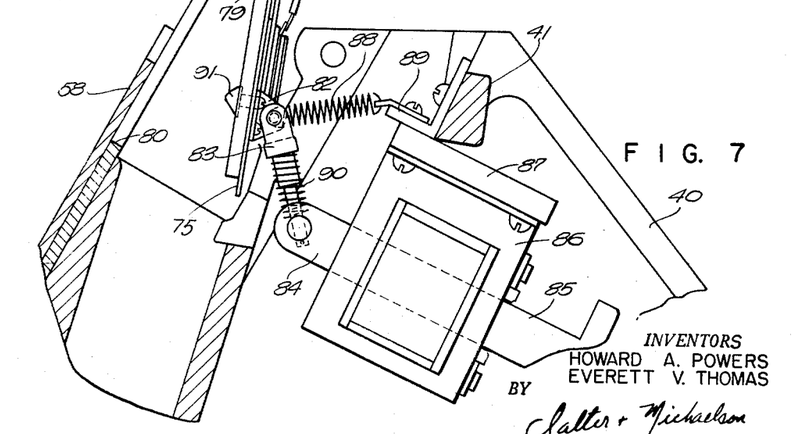
FIG. 7 is an enlarged view of a portion of the device illustrated in FIG. 4 with parts shown in section and showing in particular the scavenger door, the coin switch and the solenoid for operating the scavenger door.
Figures 8, 9:
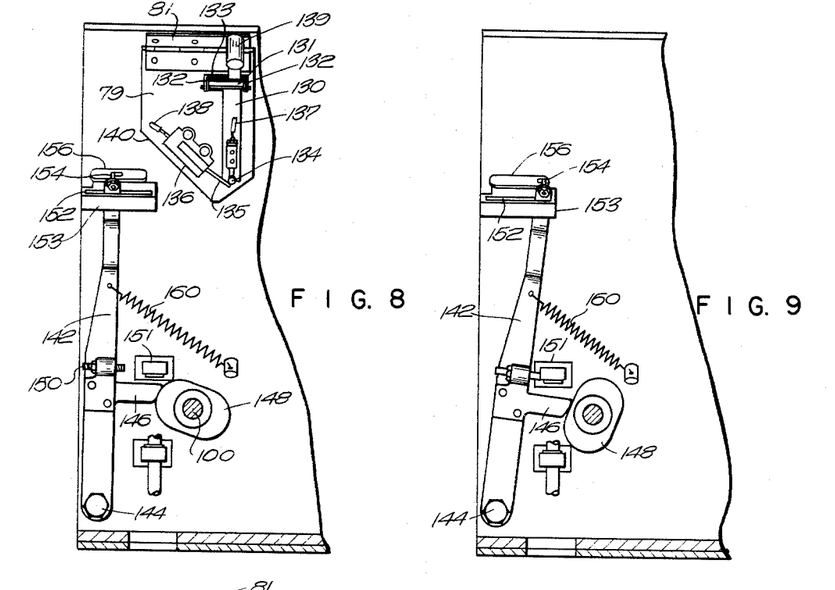
FIG. 8 is a rear elevational view of a portion of the coin machine showing the coin feed finger mechanism, the scavenger door and the coin switch structure.
FIG. 9 is a view similar to FIG. 8 showing another position of the coin feed finger mechanism.

Referring to FIGS. 7 and 8, the scavenger door 79 is shown pivotally mounted on the rear of the face plate 42 by a hinge 81. Pivotally pinned to an ear 82 that is secured to the rear of the door 79 adjacent the lower end thereof is a stepped rod 83 that is in turn pivotally connected between the bifurcated arms 84 of a solenoid plunger 85. The plunger 85 extends through a solenoid 86 that is mounted on the underside of a plate 87, the plate 87 being secured to the yoke 41 of the frame. A spring 88 connected to a plate 89 that is secured to the yoke 41 is further connected to the pin that connects the rod 83 to the ear 82 and normally biases the door 79 to an open position. A spring 90 is mounted on the bar 33 and preloads the solenoid plunger 85. The solenoid 86 is normally energized and retains the door 79 in the closed position thereof. A manually operated switch 86a (FIG. 12) is adapted to be actuated for deenergizing the solenoid 85 and thereby causing the door 79 to open. As shown in FIG. 7, the scavenger door 79 has been retracted to the open position thereof, the solenoid 86 having been deenergized to cause the spring 88 to retract the door 79 to the open position. As will be described hereinafter, a switch button 91 projects through an opening in the scavenger door 79 and is adapted to be engaged by each of the coins as they move toward the rotor 58. The switch button 91 operates a switch (FIG. 12) that energizes a motor and a solenoid that provide for rotation of the rotor 58. The switch structure together with the drive from the motor to the rotor will be described in more detail hereinafter.

Figure 5:
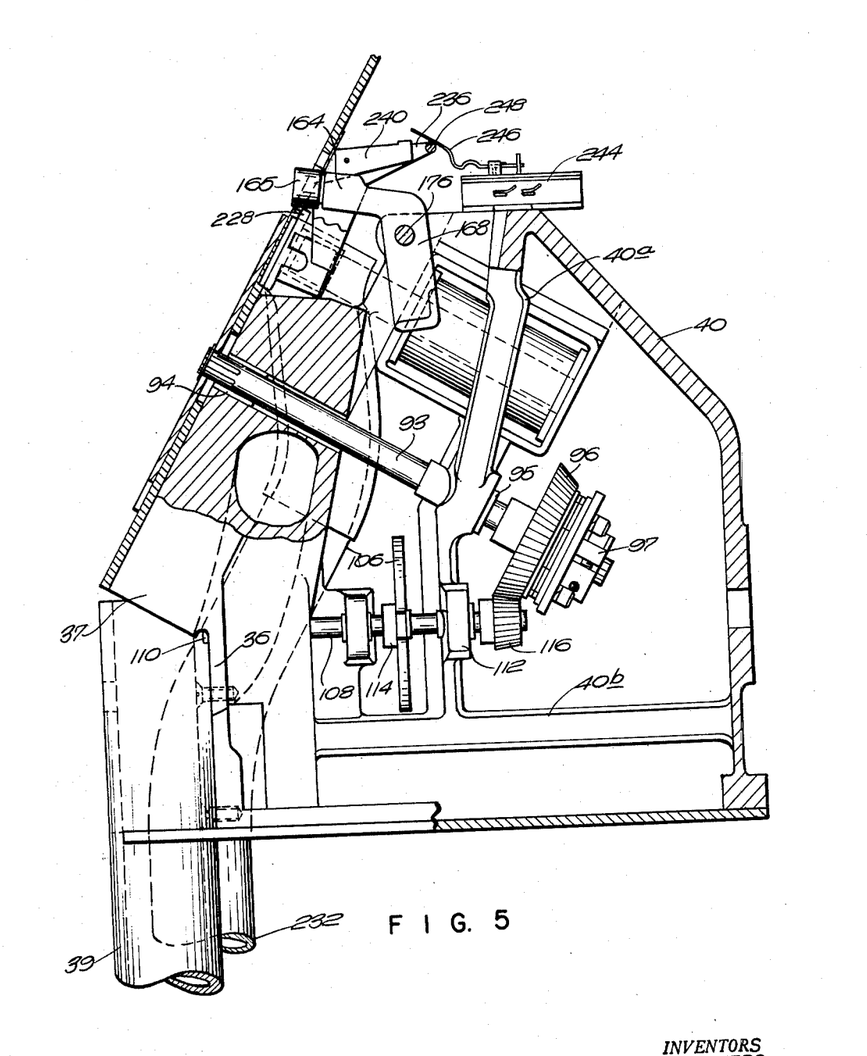
FIG. 5 is a vertical sectional view taken through the center of the coin machine between the main shaft and counter shaft.

As described above, each of the fare parts or coins is guided by the feed finger 62 and guide 64 into one of the pockets 60 of the rotor 58. As seen in FIGS. 3 and 5, the rotor 58 is a thin disc overlying the face plate 42 and includes the equally spaced open pockets 60 that are formed in the periphery thereof, the pockets being separated by radial arms 92. Each of the pockets 60 is of a width circumferentially of the rotor at least as great as the diameter of the largest coin which is to be registered by the machine, and each pocket has a bottom wall of convex arcuate curvature, concentric with the axis of the rotor disc. As shown more clearly in FIG. 5, the rotor 58 has a central opening which receives the forward end of a shaft 93, the outer end of which is splined for receiving a corresponding spline formed in the opening of the rotor 58. The rotor 58 is thus constrained to move with the shaft 93 upon rotation thereof. The shaft 93 is journalled in spaced bearings 94 and 95 carried by the enlarged portion 37 and intermediate support 40a, respectively, of the frame structure. A bevel gear 96 is mounted on the rearmost end of the shaft 93 and rearwardly of the bearing 95. A rotor adjusting mechanism indicated at 97 is secured to the rearmost end of the shaft 93 and adjacent the bevel gear 95. The operation of the rotor adjusting mechanism is essentially the same as that described in the patent to Miller No. 2,848,158, and the shaft 93 may be turned to the desired position of angular adjustment as required.

Figure 4:
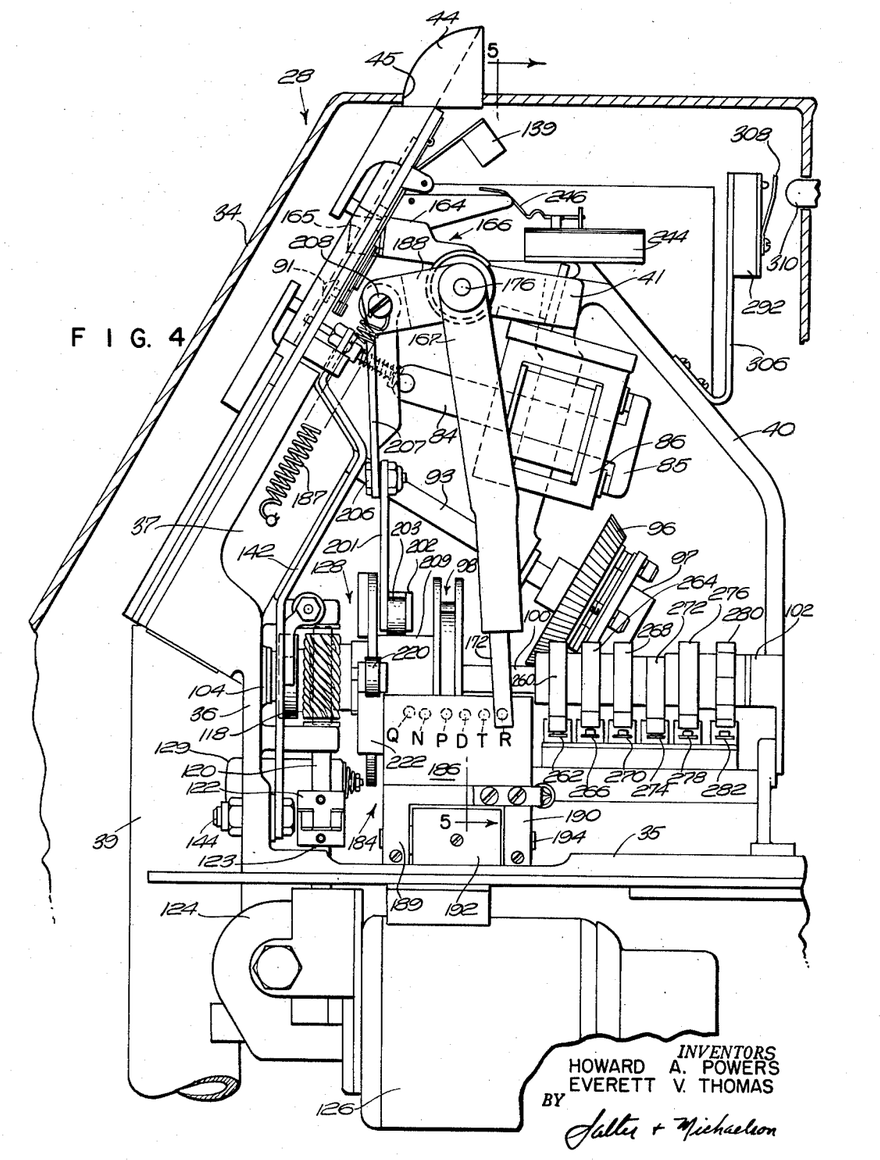
FIG. 4 is a side elevational view of the fare collecting machine illustrated in FIG. 2.

Rotor 58 in the present case has twelve equally spaced pockets 60 and is adapted to be rotated 1/12 of a revolution during each cycle in the operation of the machine and then comes to rest while the gauging of a coin takes place. In order to rotate the rotor 58 intermittently, a Geneva gear assembly is employed, and reference is again made to the patent to Miller, No. 2,848,158, for the construction of the Geneva gear assembly and its relation with respect to the drive connection to the rotor 58. As best shown in FIGS. 4 and 5 herein, the Geneva gear assembly includes a driver assembly 98 that is secured directly to a drive shaft 100, the drive shaft 100 being journalled in bearings 102 and 104 carried by the supports 40 and 36, respectively, of the main frame. The driver assembly 98 comprises two spaced plates having a locking disc interposed therebetween. A drive roller (not shown) is mounted or secured between the plates of the driver assembly 98 and is adapted to engage successive radial slots of a Geneva cam indicated at 106 in FIG. 5, the slots in the Geneva cam 106 being formed in the conventional manner and being four in number, thereby being spaced so as to rotate the Geneva cam 106 one fourth of a revolution for each revolution of the driver assembly 98. The Geneva cam 106 is mounted on a parallel countershaft 108 that is journalled for rotation in bearings 110 and 112 that are carried by the front support 36 and the intermediate support 40a respectively, of the main frame. A collar 114 is adapted to retain the Geneva cam 106 in the proper aligned position thereof with respect to the driver assembly 98, while fixed to the outer end of the countershaft 108 is a bevel pinion 116 that engages the bevel gear 96. The gear ratio between the pinion 116 and the gear 96 is 3:1 so that the total reduction from the main shaft 100 to the rotor 58 is 12:1.

The drive shaft 100 is adapted to be rotated one complete revolution for each cycle of the operation of the machine and, as best shown in FIG. 4, the means for rotating the drive shaft 100 includes a worm gear 117 (FIG. 10) that is freely rotatable upon the drive shaft 100 and is adapted to be driven by a worm 118. The worm gear 118 is fixed to the upper end of a vertical shaft 120 that is secured to one end of a coupling 122, the coupling 122 being secured to a shaft 123 that extends through the base frame 35 and is driven by a speed reducer 124. The speed reducer in turn is operatively connected to a helical gear motor 126 that is mounted beneath the base frame 35 of the coin machine.

As described in Patent No. 2,848,158, a clutch mechanism is provided for interconnecting the worm gear drive to the shaft 100. Although only generally indicated at 128 herein, the clutch mechanism is mounted on the shaft 100 adjacent the worm gear 117 that is loosely mounted on the shaft 100 and is adapted to permit limited rotation of the drive shaft 100 in response to the depositing of a coin through the coin inlet. As described in Patent No. 2,848,158, the clutch mechanism 128 includes a pawl and ratchet assembly which constitute part of the one-revolution clutch, the movement of the pawl being controlled by a solenoid 129 (FIG. 4) that is energized in response to the depositing of a coin in the machine. It is seen that as the main shaft 100 is rotated by the worm gear 118, the Geneva gear assembly 98 will be actuated to cause a one-fourth revolution of the countershaft 108 and the bevel pinion 116 mounted thereon. A one-twelfth rotation of the rotor 58 will then result as the bevel pinion 116 drives the shaft 93 through the bevel gear 96.

The operating cycle of the machine is initiated by energizing the solenoid 129 that controls the operation of the clutch mechanism 128. In accordance with the present invention, this automatically results from a deposit of a coin into the coin inlet 44, the coin gravitating downwardly through the coin channel and into engagement with the coin switch button 91. As shown in FIG. 8, the coin switch button 91 is secured to the lowermost end of a switch arm 130 that is pivotally mounted on the rear face of the scavenger door 79 by a cross-pin 131, the cross-pin 131 being secured between fixed ears 132 of a bracket 133. Secured to the lowermost end of the switch arm 130 is a connector assembly from which a contact button 134 projects. A contact arm 135 extending from a contact block 136 overlies the contact button 134 and is adapted to be engaged thereby upon pivotal movement of the contact arm 130. Leads 137 and 138 are connected to the contact button and contact arm 135, respectively, while a counterweight 139 secured to the uppermost end of the switch arm acts to normally retain the switch arm in flush relation with the rear surface of the door 79. This causes the contact button 91 to protrude through the opening in the scavenger door 79 for engagement by a gravitating coin. When a coin strikes the switch button 91, it moves the switch arm 130 rearwardly, causing the contact button 134 to engage the contact arm 135. This establishes a circuit through the motor 126 and solenoid 129 which operates the clutch assembly 128, whereby the main shaft 100 is rotated to produce the necessary one-fourth revolution of the Geneva cam 106.

As hereinabove stated, the feed finger 62 is adapted to agitate the coins as they gravitate on to the inclined edge 70, thereby insuring that the coins will be received individually within a pocket 60 of the rotor 58. In order to produce the necessary agitating or oscillating motion of the feed finger 62, an oscillating mechanism is provided and includes a feed finger drive lever 142 that is best shown in FIGS. 4 and 8. The feed finger drive lever 142 generally follows the contour of the frame and is pivotally mounted thereon by a stud 144. A follower in the form of a projection 146 is connected to the lever 142 and engages a cam 148 that is mounted on the shaft 100 for rotation therewith. The position of the follower 146 with respect to the cam 148 may be adjusted by a feed finger adjusting screw 150 that is adapted to engage a boss 151 in which the upper end of the worm 118 is journalled and thereby limits the movement of the drive lever 142. The upper end of the feed finger drive lever 142 projects through a slot 152 formed in a guide bracket 153 that is secured to the rear of the face plate 42. A feed finger drive pin 154 is mounted on the uppermost end of the drive lever 142 and projects through a slot 156 that is formed in the face plate 42.

As shown in FIG. 3, the feed finger 62 is formed with a vertically extending slot 158 therein through which the pin 154 projects. A spring 160 is joined to the forward portion 37 of the frame and to the feed finger drive lever 142 and acts to bias the feed finger lever to the right as seen in FIG. 8. Upon rotation of the shaft 100, the cam 148 will cause the feed finger drive lever 142 to oscillate as the follower 146 rides on the cam 148. Oscillation of the lever 142 produces a corresponding oscillating movement of the pin 154, thereby causing the feed finger 62 to agitate or oscillate therewith. When the machine is at rest, the feed finger 62 is in the coin guiding position shown in FIG. 3, but during each cycle of operation of the machine, the feed finger 62 will be retracted by the action of the spring 160 and held there momentarily. It is then swung back by the cam 148 to its initial position. This rocking of the feed finger 62 will agitate the coins within the lower portion of the coin channel so as to prevent the coins from jamming in the coin passage.

In order to determine the presence of acceptable coins and also to register a pulse for determining the amount of the coin inserted into the coin inlet 44, a gauging mechanism is provided in the present invention. As shown in FIG. 3, a gauging station is located just left of the guide finger 64 so that when a coin that is deposited within one of the pockets 60 of the rotor 58 is indexed with the rotor, it will be brought to the gauging station immediately after insertion thereof into the coin inlet 44. The pockets 60 of the rotor 58 are of equal size, each of a circumferential extent such that the largest coin to be registered may rest freely on the bottom of the pocket, and of a depth such that the smallest coins to be registered will project outwardly beyond the circumference described by the outer ends of the rotor arms 92. The rotor 58 is of a thickness not greatly exceeding the thickness of the largest coin to be registered, and the bottom wall of each pocket 60 is arcuately curved concentric with the axis of the rotor. When a coin occupying one of the rotor pockets 60 is brought to rest at the gauging station, its outer edge projects from the pocket so that it may be contacted by a vertically movable gauging blade 161 whose movement toward the axis of the rotor is limited by contact with the coin, the consequent position of the gauging blade 161 being used to identify the denomination of the coin located at the gauging station.

The gauging blade 161 is mounted on a block 163 that is secured to the underside of an arm 164, the arm 164 being formed as a forward extension of the yoke 41 as will be hereinafter described. The gauging blade 161 has a concave lower surface and terminates approximately half-way across the block 163 in an inclined edge, thereby providing for the mounting of a roller 165 on the block. The roller 165 which is preferably a needle bearing is mounted on a stub shaft that is secured to the block 163. The roller 165 is thus located in side-by-side relation with respect to the gauging blade so that the lower edge of the roller is tangential to a continuation of the curvature of the gauging blade 161. By positioning the roller 165 on the leading edge of the gauging blade 161, it will be seen that there is no sharp edge to grip a coin that is being indexed to the gauging station and therefore jamming of coins between the rotor arms 92 and the gauging assembly is prevented.

Figures 10, 11:
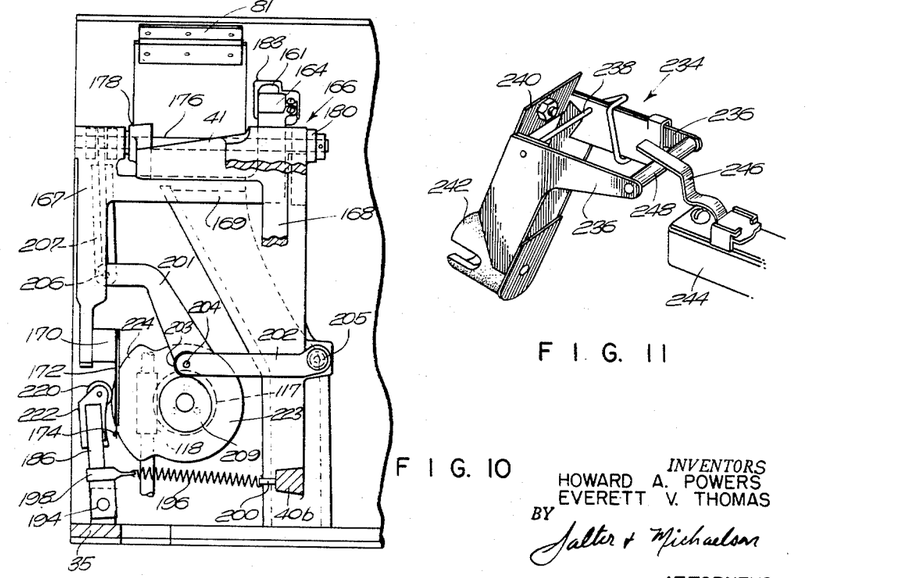
FIG. 10 is a rear elevational view of a portion of the coin machine with parts shown in section showing the retractable selector contact assembly, the cam therefor and the arm and lever mechanism for lifting the gauging blade and roller.
FIG. 11 is a top perspective view of the fare collecting apparatus showing the position of the magnetic reject switch and the magnetic reject arm that is operatively connected to the switch.

Referring to FIGS. 4 and 10, the gauging unit is shown comprising a rigid gauging arm assembly generally indicated at 166 that is located behind the face plate 42. The gauging arm assembly 166 includes laterally spaced legs 167 and 168 that are joined by a transverse bar 169, the leg 167 being substantially longer than the leg 168 and having a contact block 170 secured to the lower end thereof. Secured to the contact block 170 is a contact blade 172 on the lower end of which a contact button 174 is mounted. Extending through the upper ends of the legs 167 and 168 is a shaft 176 that also projects through spaced bearings 178 and 180 that are formed as part of the main frame yoke 41. Joined to the shorter leg 168 and projecting forwardly therefrom is the extension 164 on the front end of which is mounted the block 163 that carries the blade 161 and the roller 165. The blade 161 and the roller 165 project through a slot 183 formed in the face plate 40 and overlie the rotor 58 so that as the coins are indexed from the position in which they are received, they will be guided beneath the bottommost edge of the blade 161. This position of the gauging blade and roller with respect to the rotor 58 is shown more clearly in FIG. 5. It is seen that as a coin engages the gauging blade 161 the blade will be retained on the periphery of the coin as it is seated in a pocket 60 of the rotor 58, the consequent upward movement of the gauging blade 161 causing the gauging arm assembly 166 to be pivoted on the shaft 176, thereby producing a pivoting movement of the longer leg 167. The contact button 174 is thus caused to move in an arcuate path, the extent of the movement being determined by the diameter of the coin being gauged. Since the contact button 174 is located on the extreme tip of the contact blade 172, the limited vertical movement of the gauging blade 161 produces a relatively large movement of the contact button 174, the ratio of movement being approximately 5:1.

In order to transmit the information denoted by the gauging blade 161 into electrical pulses so that the coins deposited in the machine may be counted for indicating a fare paid, a selector contact assembly generally indicated at 184 is provided. The selector contact assembly 184 includes a selector contact plate 186 that has a series of contacts secured thereto in spaced relation as determined by the diameters of the coins being gauged. As shown in FIG. 4, contacts indicated at Q, N, P, D, T and R are mounted in the selector plate 186, the spacing of the contacts being provided for a quarter, a nickel, a penny, a dime, a token and a rest position. Tokens to be accepted may be of any desired diameter, and, accordingly, the token contact "T" will be located in accordance with the diameter of the token that is indicated for use in the machine. In the drawing, the "T" contact is indicated for a token of smaller diameter than a dime but larger than the diameter corresponding to the "Rest" contact.

As indicated in FIG. 4, the leg 167, normally referred to as the gauging leg, is positioned such that the contact blade 172 is located on the right end of the selector contact plate 186. This is the normal position of the contact blade when there are no coins at the gauging station. A spring 187, one end of which is connected to an extension 188 of the gauging leg 164 and the other end of which is connected to the forward portion 37 of the frame, causes this position to be normally maintained.

During the indexing of the rotor 58, the selector contact plate 186 must be moved out of contact with the contact button 174 and for this purpose is pivotally mounted with respect thereto. As shown in FIG. 4, the selector contact plate 186 is formed with a lower portion that is bifurcated to define spaced legs 189 and 190. The spaced legs 189, 190 are mounted in straddling engagement around a block 192 that is secured to the frame 35, a pin 194 being inserted through the legs 189, 190 and the block 192 to pivotally mount the selector bar 186 on the block 192. One end of a spring 196 is secured to a bracket 198 that is mounted on the selector contact plate 186 while the other end of the spring 196 is secured to a projection 200 that is formed as part of the cross support 40b. The spring 196 thus normally retains the selector contact plate 186 in engagement with the contact button 174.

During each gauging operation, the gauging blade 161 and the roller 165 are adapted to be raised while the rotor 58 is indexed to bring a coin into the gauging station. During this indexing step, it is necessary that the selector contact plate 186 be moved out of engagement with the contact button 174, and, furthermore, it is necessary that the gauging arm assembly 166 be pivoted to position the blade 161 at the uppermost position thereof so that the coin being indexed may enter into the gauging position. In order to move the selector contact button 174 and the gauging blade 161 as indicated, a roller link assembly is provided and includes a roller arm lever 201 that is fixed to a parallel roller arm 202. A roller 203 is mounted between the roller arm 202 and the lever 201 by a pin 204 while the arm 202 is pivotally mounted on the frame by a stud 205. Pivotally joined to the lever 201 at a pivot point 206 is a link 207 that is joined to the projection 188 by a pin 208 (FIG. 4). A cam 209 is mounted on the shaft 100 adjacent the Geneva driver assembly 98 and is engaged by the roller 203 that constitutes a follower therefor. Thus, as the cam 209 rotates with the shaft 100, the roller 203 will be raised in accordance with the contour of the cam 209. Raising of the cam 209 pivots the lever 201 on the stud 205 and elevates the link 207. Since the gauging arm assembly 166 is pivotally connected to the link 207 by the pivot pin 208, the elevation of the link 207 causes the rocker frame assembly to pivot on the shaft 176. The gauging blade 161 is thus elevated to the uppermost position thereof and is ready to engage the periphery of the coin that is being indexed to the gauging station. As hereinabove mentioned, when it is necessary to move the selector contact plate 186 so that the contact button 174 is removed from engagement with the selector plate contacts, the selector contact plate 186 is pivoted on the pin 194. This pivoting action is accomplished by providing a roller 220 that is mounted in a roller bracket 222, the roller bracket 222 being secured to the left end of the selector contact plate 186. As seen in FIG. 10, a plate 223 that is also formed as part of the clutch assembly 128 and that is secured to the main shaft 100, is contoured to define a cam 224 that is adapted to engage the roller 220 during the indexing of the rotor 58. Thus, when the roller 203 engages the eccentric portion of the cam 209 to lift the gauging blade 161 just prior to the gauging operation, the cam 224 will engage the roller 220 to retract the selector contact plate 186 out of engagement with the contact button 174. When the coin reaches the gauging station, the shaft 100 has rotated the cams 203 and 224 to the position whereby the retractable selector contact plate 186 is returned to its original position, the contact blade 172 having been pivoted in response to movement of the gauging roller to permit the contact button 174 to make contact with one of the selector plate contacts, depending upon the diameter of the coin being gauged at the gauging station. When the roller 203 moves off of the lobe of the cam 209, the gauging arm assembly 166 is pivoted on the shaft 176, and the gauging blade 161 then falls onto the periphery of the coin that has been indexed to the gauging station.

In the normal operation of the machine and when proper coins are deposited in the coin inlet, the contact button 174 of the contact blade will engage one of the selector contacts, depending upon the diameter of the coin being gauged. If the coin being gauged is not a valid coin, that is, the diameter thereof does not correspond to the diameter of a valid coin, the contact button 174 will be positioned between the selector bar contacts. In this event, a pulse that would normally be produced by engagement of the contact button 174 and one of the selector plate contacts will not result, and as will be explained hereinafter, a reject solenoid 226 mounted on the frame is energized to withdraw its plunger indicated at 227 in FIG. 6. A reject door 228 connected to the plunger 227 is then withdrawn from its position within a reject opening 230 formed in the face plate 42 and provides access to a reject chute 232. The reject chute 232 communicates with the reject opening 230 and directs the rejected coins or slugs to a return slot that is located in the forwardmost part of the housing 12 of the turnstile unit 10. Thus it is seen that if a coin or token having a diameter that is different from that of an acceptable coin is inserted into the machine, the gauging unit will detect the variance from the accepted diameters, and since contact will not be made between the contact button 174 and the selector contact plate contacts, the reject solenoid 226 will be energized to cause the reject door 228 to open. Since the rotor 58 had already indexed the unacceptable coin from the gauging station to the reject station, when the reject door is opened the unacceptable coin will fall into the reject chute 232 and will be returned to the patron.

Oftentimes a slug having a diameter that corresponds to an acceptable coin may be inserted into the machine. In this event, the diameter gauging unit will not detect the fact that the slug is not acceptable. It is therefore necessary to detect the presence of the slug by some other technique. Since unacceptable coins are usually formed of materials different from the materials from which acceptable coins are formed it is contemplated to detect this difference in material, and by so doing, determine whether the coin is acceptable. Although there are various methods that could be utilized to detect the presence of a coin formed of a material different from that of an acceptable coin, the present invention incorporates the principle of magnetism, and includes a magnet that is positioned rearwardly of the face plate 42 and adjacent the gauging station. Thus the magnet will be attracted to unacceptable coins formed of ferrous materials and since most unacceptable coins or slugs are normally formed of such materials the magnet will detect the presence of such coins and will operate the reject mechanism, to cause the unacceptable coins to be rejected from the machine.

Figure 6:
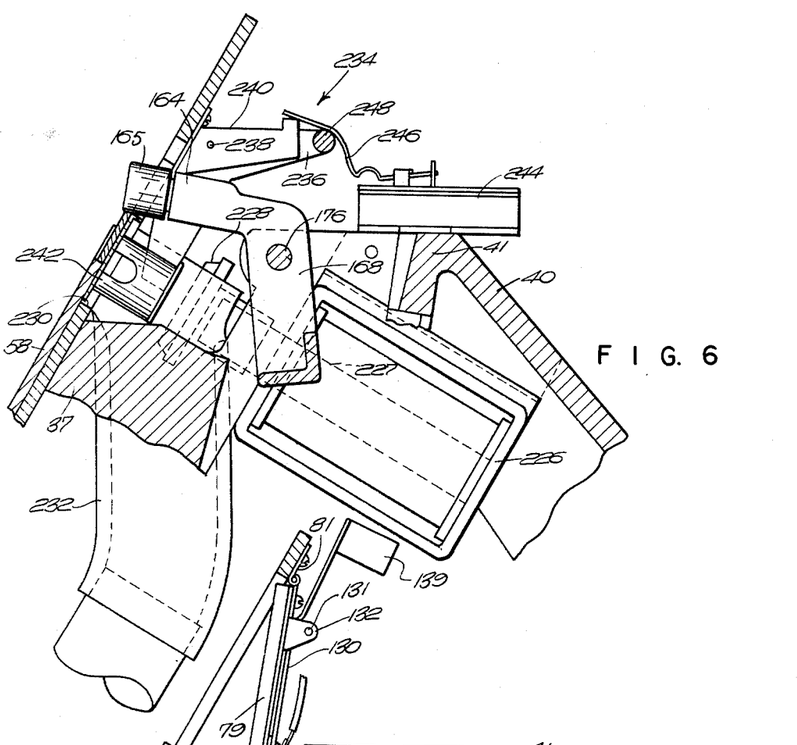
FIG. 6 is an enlarged sectional view of a portion of the device illustrated in FIG. 5.

Referring now to FIGS. 6 and 1, a magnetic reject device is illustrated and is generally indicated at 234. The magnetic reject device 234 includes a pair of parallel arms 236 that are pivotally mounted by a pivot pin 238 on a U-shaped bracket 240 that is secured to the rear surface of the face plate 42. The arms 236 have a bell crank configuration, the lowermost portion of which have a magnet 242 secured therebetween. Mounted on the yoke 41 of the frame adjacent the arms 236 is a switch 244 on which a switch arm 246 is pivotally secured. The switch arm 246 is bent upwardly to project over a rod 248 that interconnects the outer ends of the parallel arms 236, the rod 248 being movable with the parallel arms 236 when the magnet is drawn toward the face plate 42. The magnet 242 is positioned over and displaced just slightly beyond the gauging station between the roller 161 and the reject opening 230 so that if the coin or slug inserted into the machine is not only of an incorrect diameter but also of a magnetically attractable material, the reject mechanism for the gauging unit and for the magnetic reject assembly will be prevented from acting cojointly. Assuming that the coin is of an acceptable diameter but of a magnetically attractable material indicating that it is not acceptable in the machine, the magnet 242 will be brought into engagement with the rear of the face plate 42 as the unacceptable coin passes the gauging station. The switch 244 will then be actuated as the rod 248 is moved upwardly to cause the reject solenoid 226 to be energized. After the rotor 58 is indexed the reject door 228 will be opened in response to actuation of the switch 244 and the unacceptable coin will fall through the reject opening 230 into the reject chute 232 for return to the patron.

As the fares are inserted into the coin machine and indexed by the rotor 58, they are retained in position within the pockets by a coin ring spacer 250 (FIG. 1) that is formed with an arcuate inner surface 252 that is spaced from the outer edges of the radial webs 92 a sufficient amount to allow the largest coin to pass thereunder. The overlying cover plate 48 usually made of a transparent material cooperates with the coin ring spacer 250 to form a coin channel for the indexing coins as they move toward a coin discharge opening 254. The coin discharge opening 254 is formed in the face plate 42 adjacent approximately the bottommost end of the rotor 58, and as the coins are indexed thereto they contact a knockout spring 256 that is positioned within the opening 254. The knockout spring 256 is adapted to engage the coins as they are transferred thereto so as to insure that the coins are knocked into the opening 254. The coin chute 39 communicates with the discharge opening 254 and transfers the accepted coins that have been indexed by the rotor 58 to a lock box, bag, gravity chute, vacuum removal tube or the like. As described above, the scavenger chute 38 communicates with the scavenger opening 80 so that the articles discharged therethrough will fall into the coin chute 39 for transfer to the lock box or other storage means.

In operation of the present invention, the rotor 58 is indexed at predetermined intervals and is dependent upon the reception of a coin therein. Therefore, it is necessary that the rotor 58 be operated only for a predetermined period of time. The operation of the turnstile unit 12 is also determined by the insertion of the coins in the coin inlet 44 but will operate only when a proper fare has been inserted into the coin inlet. In order to properly coordinate and count the coins deposited so that a fare-paid will be recorded to operate the turnstile unit, a plurality of cams are mounted on the main shaft 100 and are adapted to actuate switches which cause a circuit to be completed, depending upon the required operation. As shown in FIG. 4, a reject cam 260 is mounted on the shaft 100 and is adapted to actuate a reject cam switch 262. A two-pulse cam 264 is positioned adjacent the reject cam 260 and is located in series with the "D" contact on the selector contact plate 186. The two-pulse cam 264 operates a switch 266 to indicate the deposit of a dime fare. It is noted here that the two-pulse cam 264 has two lobes formed thereon and will cause two pulses to be impressed on the electrical circuit to indicate the presence of the dime fare. This system is utilized since a single pulse is indicated as a nickel fare, and the counting chain to be described uses the single pulse as a basic unit in registering the fares. A single-pulse cam 268 located adjacent the two-pulse cam 264 actuates a switch 270, while a motor cam 272 actuates a motor cam switch 274, and a reject reset cam 276 operates a switch 278. The cam bank is completed by a five-lobe cam 280 that operates a switch 282, the switch 282 being put into the circuit when a quarter is deposited in the machine. Each of the cams and switches therefor are provided for producing a predetermined action in the circuit, the lobes of the cams being located in a preselected position so as to produce the desired result. It is understood that additional cams and switches could be employed to produce three, four or more pulses to indicate various monetary values for tokens.

Figure 12:
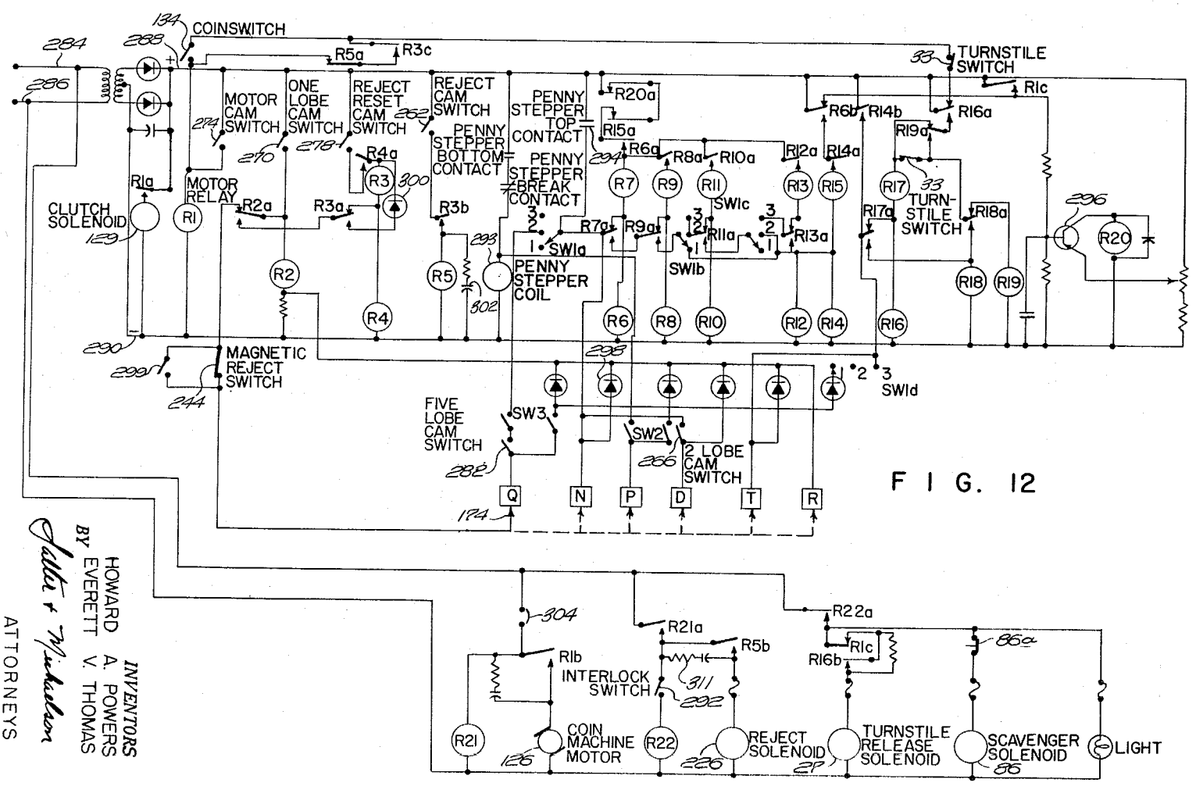
FIG. 12 is a circuit diagram of the electrical control system that controls the operation of the coin machine.

Referring now to FIG. 12, the electrical circuit for controlling the operation of the coin machine and turnstile unit is illustrated, and the operation of the device will now be described with reference being made to the electrical circuit. Alternating current is received in the machine through the leads 284 and 286. The current is then rectified in the conventional manner resulting in a positive line indicated at 288 and a negative line indicated at 290. Assuming that a coin is deposited in the coin inlet 44 and gravitates into the coin passage, the coin switch button 91 will then be contacted to close the coin switch 134, thereby completing a circuit through line 288, through a normally closed contact R16a, the normally closed turnstile switch 33 (FIG. 2a) and to the motor relay R1. This energizes the motor relay R1 causing the relay contact R1a to close and thereby energize the clutch solenoid 129. Simultaneously, the relay R1b is closed in the power supply circuit, completing the circuit to the coin machine motor 126. Since the circuit to the power supply circuit is completed when an interlock switch 292 is closed, as will be described hereinafter, the coin machine motor will then operate, and since the clutch solenoid has released the shaft 100, the rotor 58 will be rotated through the Geneva drive 98 and the bevel gearing 116 and 96 one-twelfth of a revolution. The deposited coin, which has now fallen into a pocket 60 of the rotor 58, is then indexed to the gauging station, the gauging blade 161 and roller 165 having been elevated by the gauging arm assembly 166 that was in turn pivoted in response to movement of the lever 201 and link 207 as the follower 203 was moved upwardly on the lobe of the cam 209. Continued movement of the shaft 100 causes the follower 203 to fall off of the high point of the cam 209, thereby lowering the lever 201 and resulting in the gauging blade 161 moving downwardly on the periphery of the coin at the gauging station. Since the gauging arm 167 is responsive to the position of the gauging blade 161, the contact button 174 will be located in engagement with one of the selector contacts depending upon the diameter of the coin being gauged. After the initial closing of the circuit through the coin switch 134, the motor cam 272 engages the switch 274, thereby closing the switch and retaining the motor relay R1 in the circuit. Since the coin switch 134 is only a momentary contact, it opens and will remain open until the next coin makes contact with the coin switch button 91. Thus the motor and clutch solenoid are energized only for as long as the motor cam switch 274 is closed unless another coin engages the coin switch button 91.

Before continuing with the description of the operation of the machine, it will be noted that a three-position switch indicated at SW1 is provided and is adapted to change the fare from 15 cents to twenty or to twenty-five cents. With the switch SW1 in the No. 1 position, the fare will be fifteen cents; in the No. 2 position the fare will be twenty cents; and in the No. 3 position the fare will be twenty-five cents. It is understood that the basic principles of the coin machine are not limited only to 15, 20 and 25¢ fares. The machine may be arranged to provide for any reasonable fare with any reasonable capactiy of fare paid memory and could be set to accept fifty cent pieces. A two pole toggle switch indicated at SW2 is also located in the circuit and is connected to the penny contact "P." When the SW2 switch is open, pennies will not be accepted by the machine, but as will be described, when the SW2 switch is closed, the pennies will be accepted and will be received in a manner such that upon the deposit of five pennies a single pulse will result. A switch indicated at SW3 is also provided in the circuit and is connected to the quarter contact "Q." With switch SW3 in the closed position, a quarter will contribute toward a fare; however, with the SW3 switch in the open position, a quarter will be rejected from the machine. This same principle can be used to reject or accept any desired coins or tokens as required in the operation of the machine.

Assuming now that a twenty-five cent fare constitutes a fare paid the description of the electrical circuit will be continued. As noted above, in this instance the switch SW1 is located in the No. 3 position and the SW2 switch is closed. Assuming that a penny has been deposited in the machine and has been indexed to the gauging station, the contact button 174 will then engage the selector contact "P." After a time interval allowed for positioning the contact 174 in engagement with the contact "P," the one-lobe cam switch 270 is closed by the cam 268. Voltage is then applied to a penny stepper coin indicated at 293 causing the stepper mechanism to step one position. The circuit to the penny stepper coil is the one-lobe cam switch 270, the normally-closed contact R2a, the normally-closed magnetic reject switch 244, the selector contact button 174, the selector contact "P" and the penny stepper coil 293. The penny stepper is arranged mechanically such that when five pennies are deposited, the top stepper contact indicated at 294 is closed to complete the circuit through the normally-closed contact R7a to the coil of relay R6. The normally-open contact R6a is then closed, completing a path from positive to negative through normally-closed contact R20a, normally-closed contact R15a, the contact R6a, the coil of R7 and the coil of R6. However, the relay R7 cannot energize during this pulse because there is no difference of potential across its coil. As soon as the one-lobe cam 268 releases the one-lobe cam switch 270 from the closed position, the pulse will terminate and relay R7 will energize, causing the transfer spring of the relay R7 to move from the normally-closed position to the normally-open position. Upon deposit of another five pennies in the machine, the fifth penny will again cause the top stepper contact to close, and the pulse resulting from the closing of the one-lobe cam switch 270 will be fed to the coil of relay R8. Relay contact R8a will close completing a circuit through the relays R9 and R8. However, since there is no potential across relay R9, this relay will not be energized, but upon termination of the pulse, relay R9 will operate.

Assuming next that a nickel is deposited in the machine, the circuit will be completed as described above to the motor relay R1 through the coin switch 134. The motor 126 and the clutch solenoid 129 are then energized, and the motor drives the main shaft 109, the worm 118 and the worm gear 117. The rotor shaft is then rotated through the bevel gears 116 and 94 to index the nickel to the gauging station and under the gauging blade 161 that had been previously lifted by the roller drive cam 209. At this point, the motor cam switch 274 is closed by the motor cam 272 to keep the motor 126 running for the completion of the cycle. The selector contact button 174 has now been brought into engagement with the nickel contact "N," and when the one-lobe cam switch 270 is closed by the cam 268, a circuit is completed through the contact R2a, the magnetic reject switch 244, the contact button 174 and the nickel contact "N." Since the relay contact R7a had been closed by the deposit of the pennies as previously described, the circuit continues through the normally-open contact R7a, and through the normally-open contact R9a which is moved upon the completion of the second pulse to a closed position. The circuit then continues through the No. 3 position of SW1b to the normally-closed contact R11a and the coil of relay R10 to close contact R10a. At this point, fifteen cents has been deposited, and upon opening of the one-lobe cam switch 270, relay R11 will be energized whereupon the circuit continues through the No. 3 position of SW1c to the normally-closed contact R13a and to the coil of R12. The contact R12a is then closed, but since there is no difference in potential across the coil of R13, it will not operate. Assuming now that a dime is deposited in the machine, it will be seen that the two-lobe cam switch 266 will be closed, and since contact is made from the contact button 174 through the dime contact "D," two pulses will be impressed on the circuit. On the first of the two pulses, relay R13 will operate to cause the circuit to continue to relay R14 through closing of the contacts R13a. On the second pulse, since relay R14a had been closed, relay R15 will operate, and this will result in a fare-paid. At this point, twenty-five cents in coin has been deposited in the machine. When relay R14 operates, a circuit is completed to the coil of relay R16 through the contacts R14b and R17a. At the termination of the pulse, relay R14 drops out, but relay R17 being in series with relay R16 will instantly operate. The complete circuit for relays R16 and R17 in series is through the normally-open contact R16a, normally-open contact R19a, the coil of relay R17 and the coil of relay R16.

It will be noted that the normally-open contact R19a is included in the circuit rather than the normally-closed contact. This is because during the pulse the normally-open contact R16a closes and completes a path through the turnstile switch 33, the normally-closed contact R18a and through the coil of the relay R19. At this point relay R19 operates. Contact R19a is a continuity transfer, and this makes it possible to swing the coils of relays R16 and R17 into a new circuit which puts these relays in series with the turnstile switch 33. With this arrangement, it is now possible to drop out relays R16 and R17 when the turnstile switch 33 is operated as the patron passes through the turnstile unit.

Referring to the power supply portion of the circuit diagram, it will be noted that a contact R16b will be closed to operate the turnstile solenoid 27, provided that the motor relay R1 is not energized. This arrangement prevents a cancellation of a fare-paid at the same instant that a pulse is arriving at the fare-pair chain. Therefore, when relay R16 is energized upon the deposit of twenty-five cents, the relay contact R16b will be closed to complete a circuit through relay contact R1c and the turnstile solenoid 27. It will be further noted that relay R22 had been previously energized by the closing of an interlock switch 292, and the closing of a normally-open contact R21a. Contact R21a is closed when relay R21 is energized, which causes relay R22 to be energized thereby closing the contact R22a. The turnstile release solenoid 27 is then ready to operate upon the closing of relay R16.

Assuming next that a quarter is deposited in the machine, it will be noted that there are two methods provided for registering the quarter. In the first method, the one-lobe cam 268 impresses five separate pulses on the circuit through the quarter contact "Q." These five pulses are applied to the nickel chain as previously described. However, this method of registering the fare-paid can only occur when switch SW1 is in the No. 1 or the No. 2 position, that is, when the fare is set for the fifteen cents or twenty cents. Assuming now that switch SW1 is set in the No. 3 position, the pulse impressed on the circuit will be fed directly to relay R18 through the following path: one-lobe cam switch 270, normally-closed contact R2a, switch 244, the selector contact button 174, the quarter contact "Q," No. 3 position of SW1d, the normally-open contact R17a and the coil of relay R18. It is seen that when relay R18 operates, the contact R18a which provides a locking path for relay R18 after the coin pulse terminates, also opens the circuit to relay R19. When relay R19 drops out, a continuity transfer takes place. The contact R19a of relay R19 swings the turnstile switch 33 in series with the coil of relay R18. It is now possible to drop out relay R18 when the turnstile switch 33 opens. Notice that relay R19 cannot energize with the turnstile switch 33 open. This prevents the first fare-paid relays R16 and R17 from dropping out when relay R18 is released.

Referring again to the nickel chain, it will be noted that at the termination of the fifth pulse, relay R15 is moved to the energized position thereof. Relay R15 remains in series with the relay contact R6b until relay R6 drops out. The normally-closed contact R15a opens the circuit to the first four steps of the chain. Thus, it is seen that when relay R6 drops out, all of the other relays in the chain must release. This guarantees that no step of the chain can remain energized after R6 drops out. As noted above, the normally-closed contact R15a must remain open until relay R6 releases.

In the event that the nickel chain has memorized one or more nickels, this memorized amount will be cancelled after approximately one minute has expired, that is, providing that no additional money has been deposited in the machine during the interval. Cancellation is brought about by opening the normally-closed contact R20a to which the chain is locked, after a short interval of one or two minutes. A transistor 296 controls the current through the coil of R20. The transistor is of a PNP type, which means that applying a high positive voltage on the base keeps a heavy reverse bias from base to emitter. Thus the collector current is prevented from flowing through the coil of R20. When the normally-closed contact R6b in series with the base circuit opens, the capacitor in the transistor circuit begins to discharge. Eventually the voltage at the base will fall to zero with respect to the emitter (which is also a low positive potential by the bleeder shown) and then gradually becomes negative with respect to the emitter. The collector current then begins to flow through the coil of relay R20. When this current reaches the operating value of the relay, the normally-closed contact R20a will open and drop out of the nickel chain. If, just prior to this action, a coin is deposited, relay R1 will be operated by the closing of the coin switch 134. Contact R1c will then recharge the capacitor in the transistor circuit to a high positive voltage, which will delay the operation of relay R20 for another brief interval.

Referring now to the reject portion of the circuit, reference will be made to relays R2, R3, R4 and R5. Assuming that a nickel is deposited in the machine and is indexed to the gauging station, the one-lobe cam switch 270 will be closed by the one-lobe cam 272 to cause the circuit to be completed to the relay R2. However, there is no potential difference across the coil of relay R2 since the pulse is also applied through the nickel contact "N" and the diode indicated at 298. With a positive potential on both sides of relay R2, there is no potential difference across the coil and no current can flow therethrough. In this case, relay R2 will not be energized. However, should a coin be inserted into the machine of such a diameter that the selector contact button 174 will fail to fall on a contact of an acceptable coin then the current flowing through the one-lobe cam switch 270, when it is closed, would apply a positive potential to only one side of the coil of relay R2. In this case, the relay R2 will now be energized. Upon energization of the relay R2, the contact R2a will feed the pulse from the one-lobe cam switch to the coil of relay R4 through the normally-closed contact R3a. Relay R4 will be energized, thereby closing contact R4a. At the termination of the pulse, that is, when the one-lobe cam switch 270 opens, relay R2 will drop out. At this time, the reject reset cam switch 278 will be closed by cam 276, thereby causing relay R3 to be energized. Although relay contact R3b is in series with relay R5, relay R5 will not be energized at this time because the reject cam switch 262 in series with the relay R5 is open. The contact R3c that is in series with the normally-closed contact R5a will cause the relay R1 to be energized when relay R3 is energized. The coin machine motor 126 and the clutch solenoid 129 are then operated for another cycle which will move the unacceptable coin over the reject opening 230 that is closed at this point by the reject door 228. The reject cam 260 now closes the reject cam switch 262, completing the circuit through the normally-open contact R3b to the coil of relay R5. The normally-open contact R5b is then closed in the power circuit to energize the reject solenoid 226 which opens the reject door 228, thereby allowing the unacceptable coin to fall through the reject opening 230 and into the reject chute 232, for return to the patron. It is understood that instead of being returned, the rejected coins and slugs could be retained in a receptacle located within the housing.

In the event a slug of ferrous material is introduced into the machine, the magnet 242 will be drawn into magnetic attraction therewith as the slug is indexed through the gauging station. Pivotal movement of the magnet 242 will cause the switch 244 to open thereby breaking the circuit to the contact 174. Thus even if the slug does have an acceptable diameter there will be a potential difference applied across the coil of relay R2, thereby energizing this relay. The reject circuit will then be caused to operate in the manner described above. A switch 299 is also provided in the circuit in parallel with switch 244 and may be closed to cut the switch 244 out of the circuit in the event a malfunction should develop.

It is seen that if there is no coin under the gauging blade 161 during the reject cycle, the selector contact button 174 will fall on the rest contact "R" and cause the relay R2 to be shunted down, thereby preventing it from energizing. Similarly, if during the reject cycle an acceptable coin is under the gauging blade 161, the relay R2 will again be shunted down and prevented from energizing. As described above, if an unacceptable coin should be moved under the gauging blade 161, the relay R2 will not be shunted down. In this case, relay R2 will be energized when the one-lobe cam switch 270 opens. The operation of relay R2 will prevent the reject reset cam switch 278 from dropping out relays R3 and R4. Relay R2 will then hold relays R3 and R4 energized during the brief period when the reject reset cam switch 278 opens and closes. The reject reset cam switch 278 in this instance acts as a normally-closed cam switch. During the reject cycle just prior to the time when the one-lobe cam switch 270 opens, the reject reset cam switch 278 will open, drop out relays R3 and R4, and then close again before the one-lobe cam switch 270 opens.

With relay R3 energized at the end of the reject cycle, the coin machine will automatically start another reject cycle. The complete circuit which prevents relays R3 and R4 from dropping out is the one-lobe cam switch 270, the normally-open contact R2a, the normally-open contact R3a, the diode indicated at 300, and the coils of relays R3 and R4. The capacitor indicated at 302 that is located across the coil of relay R5 holds this relay energized for a period of time after the reject cam switch 262 opens. It will be noted that the normally-closed contact R5a is in series with the normally-open contact R3c and the coil of relay R1. This prevents the coin machine from operating while the reject door 228 is opened. Hence an acceptable coin that is located under the gauging blade 161 during the reject cycle cannot be moved over into the open reject opening 230. It will also be noted that both the normally-open contact R3c and the coin switch 134 are in parallel relation and receive current from a normally-closed contact R16a of the first fare-paid relay R16. Hence, when the fare is set at twenty-five cents, it is not possible to obtain two fare-paids, but in the case of a fifteen-cent fare, if a nickel is deposited and this is followed by a quarter, two fare-paids will result.

Referring now to the power circuit of the electrical circuit, it will be noted that relays R21 and R22 are part of an interlock system. The coil of relay R21 is in series with a motor circuit breaker indicated at 304, and a contact R21a holds relay R22 energized provided the interlock switch 292 is closed. When the circuit breaker opens R21a, relay R22 will drop out.

As shown in FIG. 4, the interlock switch 292 is mounted on a bracket 306 that is secured to the frame 40 of the machine. A switch arm 308 is adapted to be engaged by a plunger 310 that extends through an opening in the rear wall of the housing 34, the plunger 310 being movable in response to the actuation of a locking device such as a lock tumbler (not shown). Thus when the machine is locked in position, the plunger 310 will be moved inwardly to engage the switch arm 308 thereby closing the switch 292 and putting the relay R22 in the circuit. In the event coins are still in the rotor pockets when the interlock switch 292 is opened, a capacitor 311 is provided for briefly retaining the motor relay R1 in the circuit, whereby the rotor 58 is indexed to empty the remaining coins located therein into the coin chute 39.

Regardless of the fare established, a token will normally represent one complete fare. It is contemplated however to denote various values for tokens, which can then be deposited in the coin machine instead of money. If the token utilized has a diameter that will cause the selector button 174 to contact the selector contact "T," the token circuit will bypass the nickel chain and the token pulse will be fed directly to the fare-paid relays R16 and R17.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In fare collecting apparatus for use in controlling access through a barrier, a rotor having pockets for receiving individual coins therein, means for driving said rotor, a coin inlet for directing said coins toward said rotor, switch means adapted to be actuated by said coins after entry into said coin inlet for actuating said driving means, means for gauging the diameter of said coins, said gauging means including a gauging blade for contacting said coins to be gauged, a selector contact blade responsive to movement of said gauging blade and a selector contact plate having a plurality of spaced contacts secured thereto, said contacts being spaced in a predetermined relation and in accordance with the diameters of said coins, wherein when an acceptable coin is engaged by said gauging blade, said selector contact blade will make contact with the corresponding contact on said selector contact plate, means responsive to engagement of said selector contact blade with a corresponding contact for actuating a reject device, a reject door operatively connected to said reject device and being adaped to open in response to the energization thereof for rejecting invalid coins through said reject door, means for totalizing the values of the acceptable coins, and means responsive to said totalizing means for energizing a control device that is actuated to allow access through said barrier when a predetermined fare is deposited in said apparatus and totalized by said totalizing means.

2. In fare collecting apparatus for use in controlling access through a barrier, a rotor having pockets formed therein for receiving coins, means for intermittently driving said rotor, a coin inlet for directing said coins toward said rotor, switch means adapted to be engaged by said coins for actuating said driving means, means for gauging the diameter of each coin including a gauging blade for engaging the coins and a gauging arm operatively connected to said gauging blade, a contact arm joined to said gauging arm, a selector contact plate having a plurality of spaced contacts mounted thereon, each of said contacts having reference to acceptable coin, said contact blade being adapted to engage one of said contacts depending upon the coin being gauged, means for rejecting an unacceptable coin and responsive to the position of said contact blade on said selector plate, said rejecting means including a reject door to which a reject solenoid is operatively connected, said reject solenoid being energized to open said door when said gauging arm is moved by said gauging blade to a position on said selector contact plate wherein said contact blade fails to engage one of said contacts, thereby indicating the presence of an unacceptable coin, and a reject chute positioned adjacent said door and receiving said unacceptable coins therein when said door is opened.

3. In fare collecting apparatus as set forth in claim 2, said rejecting means further including means for detecting the presence of a coin of magnetic material, said detecting means including a magnet located closely adjacent said rotor, a lever mechanism joined to said magnet and operatively connected to a switch, said switch being electrically connected to said reject solenoid and being actuated by said lever upon pivotal movement thereof when said magnet is drawn by magnetic attraction toward said coin of magnetic material, whereby said reject solenoid is energized to open said reject door to discharge said coin of magnetic material.

4. In fare collecting apparatus for use in controlling access through a barrier, a rotor having pockets for receiving coins therein, means for intermittently driving said rotor, switch means responsive to engagement by said coins for actuating said driving means, means for gauging the diameter of said coins at a gauging station in order to determine the denomination thereof, said gauging means including a coin engaging blade, a pivotally mounted assembly that is movable in response to the identification of each coin by said blade, and a contact arm secured to said assembly and movable therewith, a contact plate having spaced contacts secured thereto, the position of said contacts being predetermined so that the gauging of said coins by said gauging blade will position said contact arm in engagement with a contact corresponding to the coin being gauged, means for rejecting a coin that has a diameter different than that of an acceptable coin, said rejecting means including a reject door that normally closes a reject opening, and means for retaining said reject door in the closed position thereof, said retaining means being responsive to the failure of said contact arm to engage one of said contacts to open said reject door, a reject chute communicating with said reject door and receiving the detected unacceptable coins as they fall through the reject opening, and means responsive to the deposit of acceptable coins in said apparatus when said acceptable coins aggregate a predetermined fare for actuating means that controls access through said barrier.

5. In fare collecting apparatus, means for receiving and periodically indexing fare parts to a gauging station, means for gauging the diameters of said fare parts at said gauging station, means for determining a fare-paid when a preselected fare part is deposited in the machine, said fare-paid determining means including a counting chain that is responsive to electrical pulses that are produced when said gauging means gauges an acceptable fare part to electrically count said pulses, and means responsive to the absence of a pulse for rejecting unacceptable fare parts from said apparatus.

6. In fare collecting apparatus, means for receiving and periodically indexing fare parts to a gauging station, means for gauging the diameter of said fare parts at said gauging station, means cooperating with said gauging means for indicating the presence of acceptable fare parts at said gauging station, said indicating means including a series of spaced contacts that are electrically connected to an electrical counting chain, each of said contacts identifying a particular fare part and transferring an electrical pulse to said counting chain when an acceptable fare part is gauged and identified, and means for rejecting unacceptable fare parts from said apparatus, and being operative in the absence of a pulse which indicates that an unacceptable fare part has been gauged by said gauging means.

7. In fare collecting apparatus as set forth in claim 6, said rejecting means including a reject door that normally closes a reject opening that is located adjacent said gauging station, a reject circuit operative in response to the absence of a pulse to open said door, thereby providing for the rejection of said unacceptable fare parts through said reject opening.

8. In fare collecting apparatus as set forth in claim 7, said rejecting means further including a magnetic reject device that includes a magnet and a switch responsive to movement of said magnet, said magnet being responsive to the presence of a ferrous fare part to operate said switch, said switch being operatively connected in said reject circuit and cooperating therewith to open said reject door when said magnet detects a ferrous fare part.

9. In a fare collecting apparatus, a coin inlet, means defining a path for coins that have been inserted in said coin inlet, a rotor having pockets for receiving individual coins therein as they progress through said coin path, means for intermittently driving said rotor to index the coins to a gauging station, means for gauging the diameter of said coins at said gauging station, means responsive to said diameter gauging means for detecting the presence of a coin that has a diameter different than that of an acceptable coin, means responsive to said detecting means for rejecting unacceptable coins from said apparatus, secondary detecting means including a magnet that is responsive to the presence of unacceptable coins of magnetic material to actuate said rejecting means for rejecting said unacceptable coins of magnetic material from the apparatus, a barrier controlling acess through a station, and means operatively connected to said barrier and to said fare collecting apparatus and responsive to the reception of coins in the fare collecting apparatus to control the operation of said barrier, said barrier contol means being actuated upon gauging of a predetermined aggregate of acceptable coins at said gauging station to permit movement of said barrier and access therethrough, and being prevented from actuation upon detection of unacceptable coins at said gauging station or rejection of a magnetic coin by said rejecting means.

10. In fare collecting apparatus for use in controlling access through a barrier, a rotor having pockets for receiving coins therein, means for intermittently driving said rotor, switch means responsive to engagement by said coins upon insertion thereof in said apparatus for actuating said driving means for a predetermined period of time, means located at a gauging station for gauging the diameter of said coins, means responsive to said diameter gauging means for detecting the presence of a coin that has a diameter different than that of an acceptable coin, means responsive to said detecting means for rejecting unacceptable coins from said apparatus, said detecting means including a pivotally mounted gauging arm to which a contact arm is secured, said gauging arm being movable in response to movement of said gauging means, a contact plate having a plurality of contacts mounted thereon and spaced in accordance with the denomination of the coins to be gauged, said contact arm being movable by said gauging arm through an arc corresponding to the distance between said contacts, means responsive to engagement of said contact arm with one of said contacts for determining the denomination of the coin being gauged, and control means operatively connected to said denomination determining means for controlling access through said barrier, said control means being inoperative upon detection of an unacceptable coin to prevent access through said barrier.

11. In fare collecting apparatus, a coin inlet, means defining a path for coins which drop through said coin inlet, means for receiving said coins therein from said coin path and intermittently indexing said coins to a gauging station, means for gauging the diameter of said coins at said gauging station, means responsive to said diameter gauging means for detecting the presence of an unacceptable coin that has a diameter different than that of an acceptable coin, means responsive to said detecting means for rejecting the unacceptable coins from said apparatus, said gauging means including a gauging blade to which a pivotally mounted gauging arm is secured, and a contact arm connected to said gauging arm and cooperating with said detecting means for determining the denomination of the deposited coins with respect to their diameter.

12. In fare collecting apparatus, a coin inlet, means defining a path for coins which drop through said coin inlet, means for receiving said coins therein from said coin path and intermittently indexing said coins to a gauging station, means for gauging the diameter of said coins at said gauging station, means responsive to said diameter gauging means for detecting the presence of an unacceptable coin that has a diameter different than that of an acceptable coin, means responsive to said detecting means for rejecting the unacceptable coins from said apparatus, a secondary rejecting means including a magnet that is secured to a pivotally mounted arm, a switch responsive to movement of said pivotally mounted arm and connected in circuit to a reject solenoid, and a reject door operatively engaged by said solenoid and responsive to operation thereof to open a reject opening, whereby unacceptable coins may be rejected through said reject opening.

13. In apparatus for controlling access through a pay station, a barrier normally preventing passenger movement through said station, a coin machine operatively connected to said barrier and operative upon the receipt of a preselected fare to permit movement of said barrier thereby allowing access therethrough, said coin machine including means for receiving and periodically indexing deposited fare parts to a gauging station, means for gauging the diameters of said fare parts at said gauging station, means responsive to said gauging means for rejecting unacceptable fare parts from said coin machine, means responsive to said gauging means for determining a fare-paid when said preselected fare is deposited in the machine, said gauging means including a movable contact arm, a plurality of spaced contacts positioned in accordance with the diameter of acceptable fare parts and adapted to be engaged by said contact arm when an acceptable fare part is indexed to said gauging station, and switch means electrically connected to said contacts and responsive to engagement thereof by said contact arm for producing an electrical pulse, said means for determining a fare paid counting said pulses and indicating the fare paid when a preselected number of pulses are counted, said rejecting means nicluding means responsive to the absence of a pulse for indicating that said contact arm is not in engagement with one of said contacts and that the fare part being gauged has a diameter that is not that of an acceptable coin.

14. In fare collecting apparatus, means for receiving and periodically indexing fare parts to a gauging station, means for gauging the diameters of said fare parts at said gauging station, a selector contact plate assembly having a plurality of spaced contacts mounted thereon, each of which has reference to a preselected fare part, means responsive to movement of said gauging means for establishing electrical contact with one of said contacts when an acceptable fare part is being gauged, a plurality of switches, each of which is adapted to be connected in circuit with one of said contacts, a plurality of cams operative in timed relation with said indexing means to periodically close said switches, a counting chain located in circuit with said switches and periodically receiving an electrical pulse when one of said switches is closed by its associated cam, means responsive to the counting of a predetermined number of pulses by said counting chain to indicate a fare paid, and means for rejecting unacceptable fare parts from said apparatus and being operative in the absence of a pulse being received by said counting chain.

15. In apparatus for controlling access through a pay station, means for normally prohibiting passenger movement through said station, a fare collecting machine operatively interconnected to said prohibiting means and including means for determining a fare paid when a fare part aggregating a preselected fare is deposited in said machine, said fare paid determining means including a counting chain responsive to electrical pulses that are produced when said fare part is accepted by said machine, said counting chain electrically totalling the deposited fare part and actuating said prohibiting means if the fare part constitutes a fare paid, and means responsive to the absence of a pulse for rejecting unacceptable fare parts from said machine.

16. In fare collecting apparatus as set forth in claim 11, said detecting means including a contact plate having a plurality of contacts secured thereto in spaced relation, each of said contacts having reference to an acceptable coin, so that upon contact thereof by said contact arm during the gauging operation, an acceptable coin will be indicated, but upon failure of said contact arm to engage a contact during the gauging operation, said rejecting means will be actuated to reject the coin being gauged.

17. In apparatus as set forth in claim 13, said rejecting means further including a solenoid to which a reject door is connected, said reject door normally closing a reject opening located adjacent said gauging station, said reject door being withdrawn by said solenoid when an unacceptable fare part is detected to provide access through said opening for said unacceptable fare part.

18. In fare collecting apparatus as set forth in claim 14, said rejecting means including a reject door normally closing a reject opening, a solenoid connected to said door and being normally deenergized, said solenoid being connected in circuit to a reject circuit, said reject circuit being responsive to the absence of a pulse being received by said counting chain to energize said solenoid whereby said reject door is opened to provide for rejection of said unacceptable fare parts through said reject opening.

19. In fare collecting apparatus as set forth in claim 14, said rejecting means including a pivotally mounted magnet located adjacent said gauging means and a switch responsive to movement of said magnet and located in circuit with a normally deenergized solenoid, a reject door connected to said solenoid and normally closing a reject opening located adjacent said gauging station, said solenoid being connected in circuit to a reject circuit that is responsive to the absence of a pulse being received by said counting chain to energize said solenoid, whereby said reject door is opened to provide for rejection of said unacceptable coins through said reject opening.

References Cited in the file of this patent

UNITED STATES PATENTS

| | | |
|---|---|---|
| 1,758,514 | Grover | May 13, 1930 |
| 2,298,440 | Vieth | Oct. 13, 1942 |
| 2,603,333 | Richey | July 15, 1952 |
| 2,810,465 | Miller | Oct. 22, 1957 |
| 2,848,158 | Miller | Aug. 19, 1958 |